United States Patent [19]

Jansky et al.

[11] Patent Number: 4,881,655
[45] Date of Patent: Nov. 21, 1989

[54] SELF-CLOSING FUEL TANK SEAL

[75] Inventors: Jaroslav Jansky, Rosenheim; Angelika Temmesfeld, Raubling, both of Fed. Rep. of Germany

[73] Assignee: Temtec Fahrzeugtechnik Entwicklungsgesellschaft mbH, Raublin, Fed. Rep. of Germany

[21] Appl. No.: 222,409

[22] Filed: Jul. 21, 1988

[51] Int. Cl.$^4$ .............................................. B65D 51/16
[52] U.S. Cl. ................................... 220/209; 141/349; 251/149.2
[58] Field of Search ................ 220/334, 209; 141/348, 141/349, 350; 251/149.2; 137/527.2, 527.6, 527

[56] References Cited

U.S. PATENT DOCUMENTS

| | | | |
|---|---|---|---|
| 2,657,824 | 11/1953 | Mariani | 137/527 X |
| 3,482,603 | 12/1969 | Outcalt | 251/303 X |
| 3,580,414 | 5/1971 | Ginsburg | 251/149.2 X |
| 4,027,695 | 6/1977 | Schnatmeyer et al. | 137/527 |
| 4,248,279 | 2/1981 | Warmbold | 251/149.2 X |

FOREIGN PATENT DOCUMENTS

| | | | |
|---|---|---|---|
| 153677 | 11/1986 | European Pat. Off. | |
| 2427577 | 12/1975 | Fed. Rep. of Germany | 137/527 |
| 778869 | 3/1935 | France | |
| 242087 | 11/1925 | United Kingdom | 137/527.6 |

Primary Examiner—Stephen M. Hepperle
Attorney, Agent, or Firm—Helfgott & Karas

[57] ABSTRACT

A self-closing fuel tank closing device mountable on a fuel tank filler pipe includes a filler cap which is tensioned in the direction of a sealing seat and is rotatable in the direction of the interior of the filler pipe. The filler cap is carried by a swivel arm supported at one end thereof. In order to achieve a small construction and degressive torque characteristics on opening the filler cap, it is provided that the free end of the swivel arm is supported on a supporting surface which runs approximately perpendicular to the longitudinal axis of the fuel tank closing device. The device further includes a clamping device which pretensions the filler cap in the direction of the sealing seat and is mounted on the swivel arm in the region between the free end and the filler cap.

14 Claims, 3 Drawing Sheets

SELF-CLOSING FUEL TANK SEAL

The invention relates to a self-closing fuel tank closing device, which is to be mounted on a fuel tank filler pipe, with a filler cap, which is tensioned in the direction of a sealing seat, rotatable in the direction of the interior of the spout and carried by swivel arm supported at one end.

Such a fuel tank closing device is known from the French Patent No. 778,869.

In the known fuel tank closing devices, a torsion spring is provided, which pretensions the tiltable filler cap in the direction of the sealing seat. On opening the filler cap by tilting it in the direction of the interior of the spout, the torsion spring is increasingly strained, so that the torque in the closing direction constantly increases. If the torsion spring is so dimensioned that the filler cap in the closed state is stressed with a sufficient torque against the sealing seat, then the torque increases to such an extent on opening the filler cap, that the introduction of the filling pump delivery nozzle into the filler pipe can create difficulties. The friction between the filler cap and the introduced filling pump delivery nozzle therefore is so large, that especially also the removal of the filling pump delivery nozzle from the filler pipe is made difficult. Despite the use of a torsion spring, which as such requires litte space, the known fuel tank closing device is so large, that it exceeds the external dimensions of the fuel tank filler pipe. The known fuel tank closing device therefore is not suitable for being mounted on a fuel tank filler pipe as if it were a tank cap. In such a case, the known fuel tank closing device would project appreciably beyond the edge of the opening of the fuel tank filler pipe, axially as well as radially. This would be completely unacceptable in modern motor vehicles.

Moveover, a self-closing fuel tank closing device is known from the European Patent No. 0 153 677. This fuel tank closing device has a compression spring as closing spring, which is guided by a telescopic rod guiding system below the point of support of the filler cap. Admittedly, advantageous torque characteristics in the closing direction are achieved with the known fuel tank closing device. However, the compression spring and its telescopic rod guiding system require space and limit the opening motion of the filler cap. The known fuel tank closing device can therefore be used only for fuel tank filler pipes with an adequate inside diameter.

It is therefore an object of the invention to provide fuel tank closing device of the initially named type, which is constructed so small, that it can be mounted on a fuel tank filler pipe as if it were a tank cap and the closing torque characteristics of which on tilting the filler cap are advantageous. Advantageous closing torque characteristics are defined as a comparatively large torque with the filler cap closed and a comparatively small torque with the filler cap open.

This objective is accomplished thereby that the free end of the swivel arm is supported on a support surface running approximately perpendicular to the longitudinal axis of the fuel tank closing device and that a clamping device, which tensions the filler cap in the direction of the sealing seat, is mounted on the swivel arm in the area between the free end and the filler cap.

Due to the inventive construction, degressive closing torque characteristics of the filler cap are achieved when opening the filler cap. This can be attributed to the fact that, in the course of the opening motion of the filler cap, the free end of the swivel arm, which is supported on the support surface, approaches the line of application of force of the clamping device. As a result, the lever arm, which determines the tilting the filler cap, is shortened and the torque - despite a possible increase in the force of the clamping device - is reduced. Surprisingly it has been ascertained that a fuel tank closing device pursuant to the invention can be constructed exceedingly small and nevertheless enables the filler cap to be opened completely, that is, to be tilted by about 90°.

According to an advantageous embodiment of the invention, the free end of the swivel arm is constructed as a cam guide, which glides over the support surface as the filler cap is tilted. The tilting motion of the filler cap is not a rotary motion about a fixed center of rotation. Depending on the shape of this cam guide, this tilting motion can be arranged so as to bring the filler cap during the opening procedure into a position, which is optimal with respect to the given boundary conditions of a fuel tank closing device.

If the cam guide, pursuant to a particularly advantageous embodiment of the invention, is shaped so that the filler cap is shifted translationally in the course of the opening motion in the direction of the interior of the fuel tank filler pipe, then the filler cap thereby attains a position, in which it can be opened by an angle of nearly 90° and in which it hugs optimally the tubular side wall of the fuel tank closing device. Due to the shape of the guide cam selected, it is furthermore achieved that a torque always acts on the filler cap in the closing direction. The filler cap thus does not reach a "dead center", even if it were to be tilted beyond 90°.

According to a further advantageous refinement of the invention, the support surface on which the free end of the swivel arm of the filler cap is supported, is located at an axial position in the vicinity of the edge of the opening of the fuel tank filler pipe. With such a construction, the filler cap can be disposed practically level with the edge of the opening of the filler pipe and thus at the entrance of the fuel tank closing device. A dead space in front of the filler cap, where rain water, for example, could collect and flow into the fuel tank when the filler cap is opened, is thus avoided. Due to the fact that the invention fuel tank closing device is small in structure, the supporting surface can even lie at an axial position, which is in front of the edge of the opening, if the fuel tank closing device is placed like a filler cap on the fuel tank filler pipe of a motor vehicle.

According to a further advantageous embodiment, the clamping device comprises a bracket, which is hinged to the swivel arm and tensioned by at least one spring. It is furthermore advantageous if the bracket is guided in an axial guide, so that the hinge point, at which the force of the clamping device acts on the swivel arm, is immovably fixed in radial direction. By these means, it is achieved that the swivel arm carries out a precisely defined movement in the course of the opening of the filler cap. This precisely defined movement can be described as a rotational movement about the hinge point, on which is superimposed a translation axial movement of the hinge point.

According to a further advantageous embodiment of the invention, the spring of the clamping device is disposed in a spring housing, which projects in axial direction over the edge of the opening of the fuel tank closing device. By these means, the interior of the fuel tank closing device is kept free of the clamping device and the associated spring, so that there is sufficient free space to accommodate filler cap in the open position. On the other hand, the spring housing projects only slightly over the edge of the opening of the fuel tank closing device and therefore does not interfere.

According to a further advantageous embodiment, the spring is a compression spring, which exerts pressure on the bracket in the axial direction and in this manner exerts the closing force on the filler cap. Even if the spring were to break, its closing force would therefore not be lost completely. This is extremely advantageous for safety reasons. It is furthermore advantageous if two parallel springs are provided to double the force on the bracket and thus on the filler cap.

The inventive continuation of the concept of the inventive provides that an operating mechanism to operate a valve is disposed on the moving parts of the fuel tank closing device. The valve may be either a compensator valve or also a control valve to operate a fuel vapor recovery equipment.

According to a further advantageous embodiment, the movement of the free end of the swivel arm of the filler cap may advantageously be used to operate a compensator valve. For this purpose a cam, which supports an axially displaceable cam follower, is mounted at the free end of the swivel arm. The cam follower preferably is guided in the wall of the fuel tank closing device. When the filler cap is opened, the cam moves in the direction of the edge of the opening and clears the path for the cam follower in the direction of the edge of the opening. A valve arm, which is supported at the opposite, inwardly pointing end of the cam follower, may therefore - under the tension of a spring - move in the direction of the edge of the opening. As a result of this, the valve of a compensator is closed. With this, no fuel can reach the compensator while tanking up. If, however, the filler cap is closed, a pressure is exerted on the cam follower in the direction of the interior of the fuel tank filler pipe, so that the compensating valve opens up and the fuel, expanding as a result of a temperature increase, finds space in the compensator.

According to a different advantageous further development, the operating mechanism comprises an electric switch. This can be used to operate a magnetic value for opening and closing the compensator.

In this connection, it is particularly advantageous if a magnetic switch (REED switch) is used, for the operation of which a permanent magnet is disposed on the moving parts of the closing device (swivel arm or clamping device). The force, which must be applied in this case to operate the compensator valve, is negligibly small.

According to yet another advantageous further continuation of the inventive concept, a pressure safety valve is disposed in the filler cap. By means of this, any dangerous pressure in the interior of the tank can be reduced.

The invention is described in greater detail in the following by means of examples of the operation shown schematically in the drawings. In the drawings, identical or similar parts have been given the same reference numbers.

Figure 1:
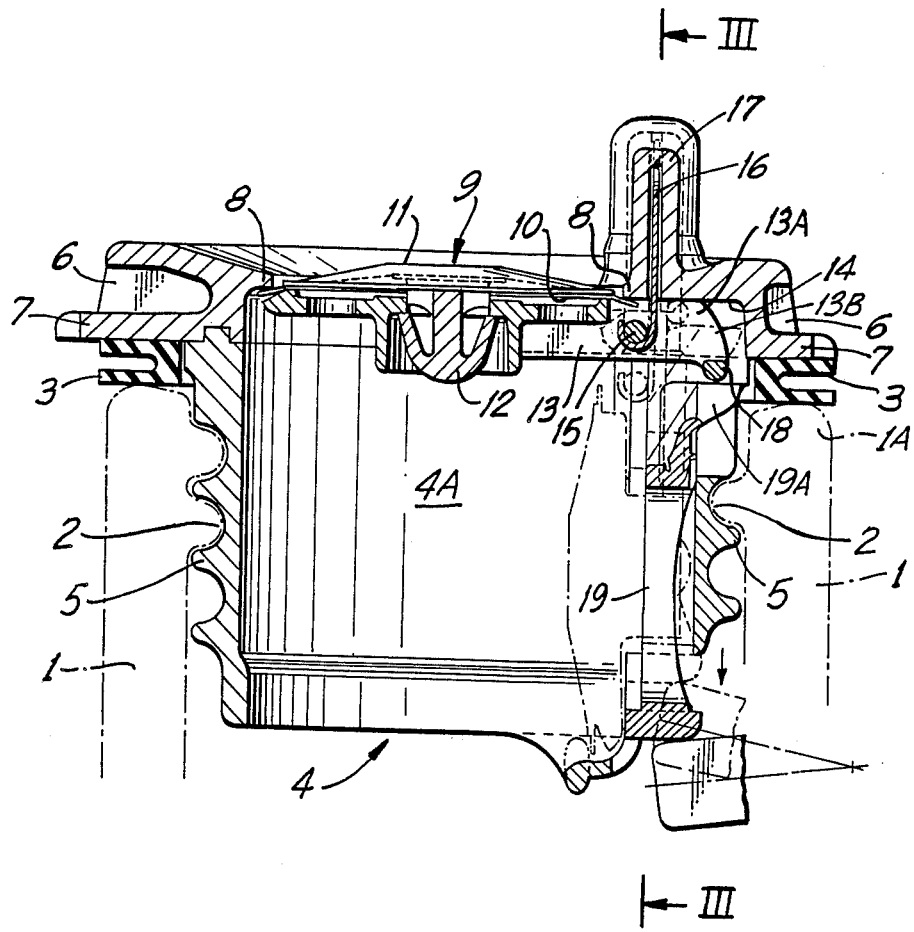
FIG. 1 is an axial section through a fuel tank closing device, which is intended for a fuel tank filler pipe with screw cap.

In FIG. 1, reference number 1 marks a motor vehicle fuel tank filler pipe, which is indicated by a broken line. The fuel tank filler pipe has an internal thread 2, which usually serves to accommodate the exterior thread of a tank cap (not shown). The front surface 1A of the fuel tank filler pipe 1 serves as a support for the seal 3.

Instead of the normal tank cap, a self-closing fuel tank closing device 4 is screwed into the fuel tank filler pipe 1. It has an tubular section 4A with an external thread 5. A flange 7, which is reinforced by reinforcing ribs 6 and is supported on the front surface 1A of the fuel tank filler pipe 1 with compression of a seal 3, is mounted on the tubular part 4A. The flange 7 and the tubular parts 4A are connected together by ultrasonic welding. The flange 7 has an internal shoulder, which is constructed as a sealing seat 8 for a filler cap 9. The filler cap 9 is covered on the outside with a sealing membrane 10. The sealing membrane is held on the filler cap 9 by means of a cap 11. With the help of a clip locking device 12, cap 11 locked into a central borehole of the filler cap 9.

For tiltably mounting the filler cap 9, a swivel arm 13, comprising two parallel bars, is fastened to the underside of the filler cap. On one side of the filler cap 9, the swivel arm 13 extends beyond the outer edge of thee filler cap 9. In its end region, the swivel arm 13 has a hump 13A, which goes over into a control surface 13B, which is curved on the front face. The end region of the swivel arm 13 protrudes into a recess of the flange 7. This recess of the flange 7 has a supporting surface 14 perpendicular to the longitudinal axis of the fuel tank closing device. The swivel arm 13, with its hump 13A, is supported on the supporting surface 14 in such a manner, that the motion of the end region of the swivel arm in the direction of the opening region of the fuel tank filler pipe is limited, while on the other hand, however, the swivel arm is movable in principle in the opposite direction, that is, in the direction of the interior of the fuel tank filler pipe. The support surface 14 is flat, so that the hump 13A and the control surface 13B, the front face of which is curved, can glide over the support surface 14.

In the region between the filler cap 9 and the hump 13A of the swivel arm 13, a crossbolt 15 is disposed, which connects the two bars of the swivel arm 13. A clamping device which is mounted on the swivel arm 13 includes a bracket 16, J-shaped in cross section which, is hinged at the crossbolt 15. This bracket 16 protrudes into a spring housing 17, which projects in axial direction over the edge of the opening of the fuel tank closing device. The bracket 16 is tensioned by a spring in the direction of the housing 17. The details of this are discussed further below, making use of the presentation of FIG. 3. At the outermost end of the swivel arm 13, a further hump is disposed, which points towards the interior of the fuel tank filler pipe and carries a pin-shaped cam 18. In the outer wall of the tubular part 4A of the fuel tank closing device, a recess is provided, in which the cam follower 19 is guided so that it can move axially. The cam follower 19 is supported with an axial front face 19A on the cam 18.

The self-closing fuel tank closing device works as follows. Instead of a tank cap with an external thread, the self-closing fuel tank closing device 4 is screwed with its tubular part 4A, which has an external thread 5, into a fuel tank filler pipe 1 with internal thread 2. At the same time, the seal 3 is compressed by flange 7 and a tight connection is thus produced between the fuel tank filler pipe 1 and fuel tank closing device 4.

Since the swivel arm 13 with its hump-shaped mechanical stop 13A is supported on the axial support surface 14 and since, on the other hand, a spring force acts on the crossbolt 15 over the bracket 16 in the direction of the supporting surface 14, the swivel arm 13 and the filler cap 9 experience a torque, which presses the filler cap 9 with its sealing membrane 10 against the sealing seat 8. The magnitude of the closing torque arises out of the distance between the bearing point of the hump 13A at the supporting surface 14 and the direction of force of the bracket 16.

Figure 2:
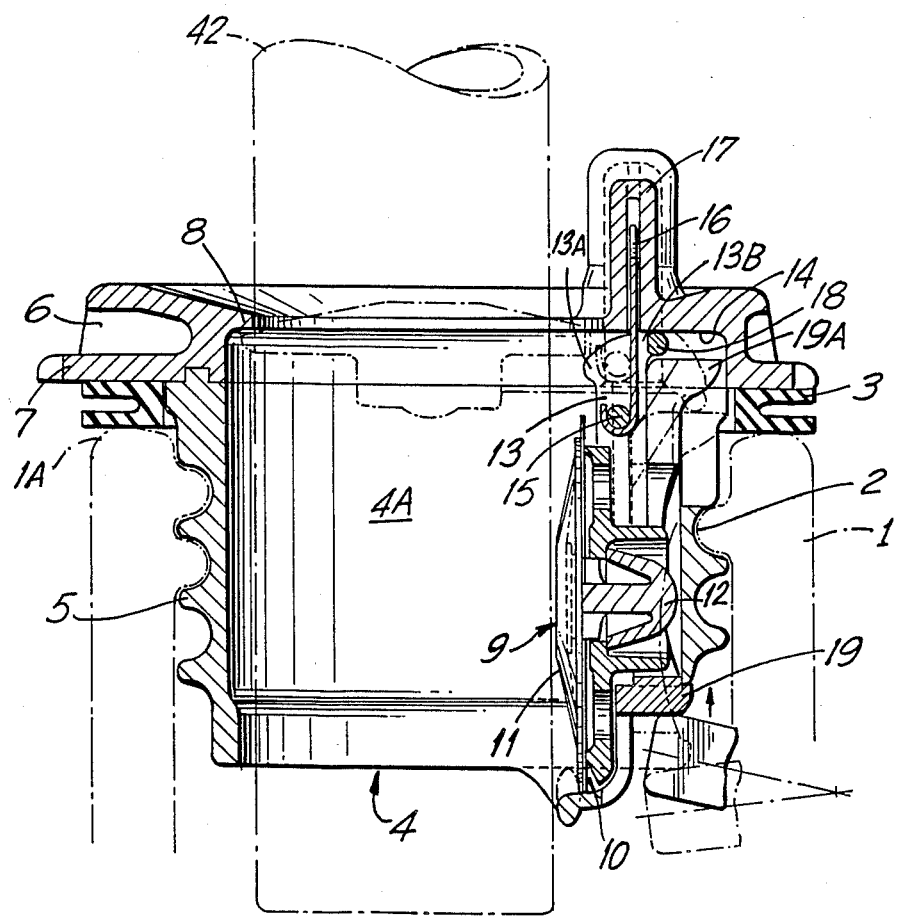
FIG. 2 shows the fuel tank closing device of FIG. 1, however with the filler cap in the open position.

To fill fuel into fuel tank filler pipe 1, a filling pump delivery nozzle 42 (FIG. 2), by means of which the swivel-mounted cap 9 is tilted in the direction of the interior of the fuel tank filler pipe, is introduced into the tank closing device. This position of the filler cap is shown in FIG. 2. As is evident from viewing FIGS. 1 and 2 together, the point of support of the end region of the swivel arm 13, starting out from the hump 13A, shifts to the front, curved control surface 13B. During the opening motion of the swivel-mounted cap 9, the the crossbolt 15 moves in the axial direction toward the interior of the fuel tank filler pipe. The spring housing 17 provides for guidance in the axial direction and prevents radial or tangial movements of the bracket 16 and the crossbolt 15.

As is clearly evident from FIG. 2, the filler cap can be tilted by almost 90°, so that access to the fuel tank filler pipe for the filling pump delivery nozzle 42 is completely cleared. In the region, in which the filler cap 9 lies against the wall of the tubular part 4A of the fuel tank filler pipe 1, there are no springs, which could stand in the way of the opening motion of the filler cap 9. As is evident from FIG. 2, the distance between the force vector acting on the crossbolt 15 and the point of support of the swivel arm 13 on the support surface 14 is smaller than for the position shown in FIG. 1. As a result, the torque exerted on the filler cap 9 also becomes smaller. However, the force acting on the crossbolt 15 is larger, since the bracket 16 is pulled out of its spring housing 17 and its associated return spring, which is described further below, is tensioned additionally. The increase in the force of the spring is, however, compensated for by the reduction in the size of the lever arm described above. This accomplishes that the filler cap 9 experiences a closing torque, which is rather constant and which, in any case, is not increased significantly when the filler cap is open.

The motion, which the cam 18 experiences at the outermost end of the swivel arm 13, can be utilized to operate a compensator valve (not shown). As is evident from a comparison of FIGS. 1 and 2, the cam 18, as the filler cap 9 is being opened, moves in axial direction towards the open end of the fuel tank closing device. The cam follower 19, guided in the wall of the tubular part 4A of the self-closing fuel tank closing device 4, is therefore released when the cap 9 is in the open position, so that it can be shifted in the direction of the open end of the fuel tank filler pipe. The cam follower 19, guided in the wall of the tubular part 4A of the self closing fuel-tank closing device 4, is therefore released with the flap 9 is open, so that it can be shifted in the direction of the open end of the fuel tank filler pipe. A control level of a compensator (not shown), tensioned by a spring, can therefore move in the same direction. As a result of such a movement, the compensator valve is closed, so that no fuel can enter the compensator while cap 9 is in the open position, that is, while fuel is being filled into the tank. However, when closing the filler cap 9, cam 18 forces the cam follower 19 into the interior of the fuel tank pipe, as a result of which the compensator is opened, so that fuel, expanding as a result of warming up, can enter the compensator.

Figure 3:
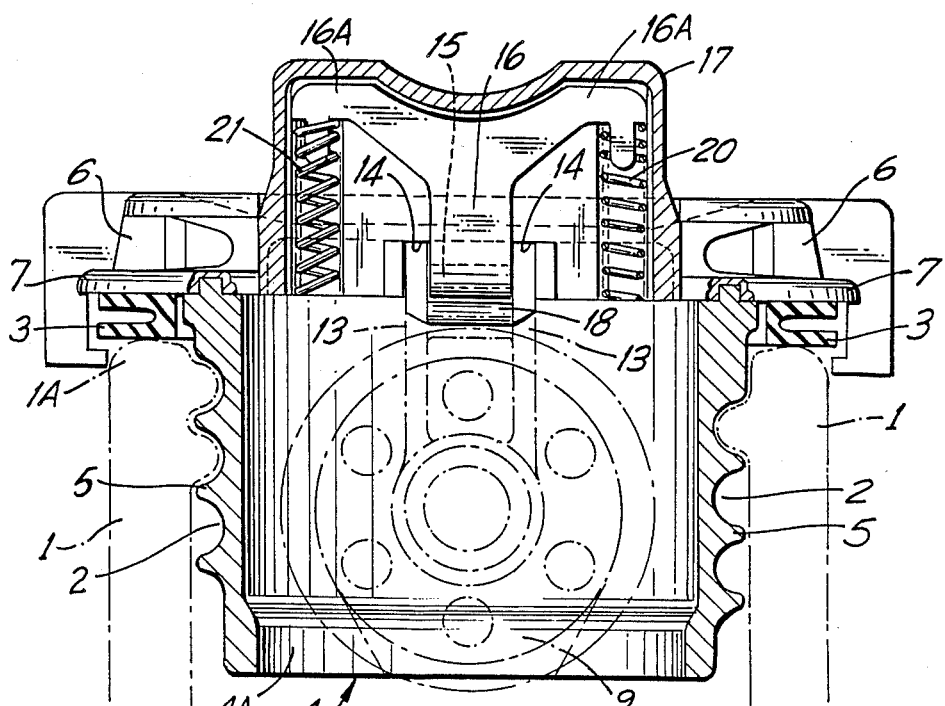
FIG. 3 shows a section along the line III—III of FIG. 2.

The clamping device, which comprises the bracket 16 and the spring assigned to this bracket, is described in the following by means of the representation of FIG. 3. FIG. 3 shows a section along the line III—III of FIG. 2.

As is evident from viewing FIGS. 1 and 3 together, the spring housing 17 is a rectangular, flat construction, which projects in the axial direction over flange 7. In the spring housing 17, the bracket 16, J-shaped in cross section, is guided movably in the axial direction. Bracket 16 has a cross arm 16A, so that in plan view it has the shape of a T.

As was already described by means of FIGS. 1 and 2, the lower semicircularly bent end of bracket 16, which is J-shaped in cross section, is secured to the crossbolt 15 of the swivel arm 13. In the outer small faces of the spring housing 17, two axial boreholes are provided, in which two compression springs 20 and 21 of the clamping device are disposed. Bracket 16 is tensioned by the two compression springs 20 and 21 in such a direction, that it pulls the swivel arm 13 of the filler cap 19 in th direction of thw supporting surface 14.

Figure 4:
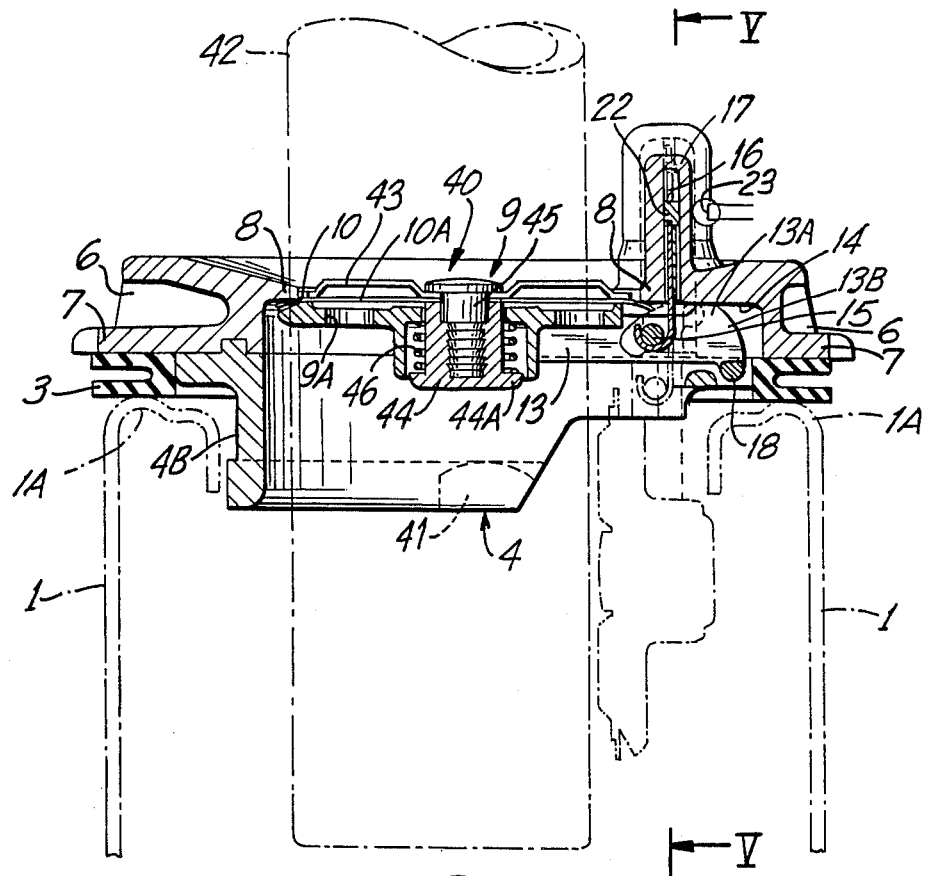
FIG. 4 shows a fuel tank closing device, which is intended for a fuel tank filler pipe with internal bayonet mechanism (Renk closing device)

In FIG. 4, a further example of the operation is shown. The example of the operation, shown in FIG. 4, differs from the example of the operation of FIGS. 1 to 3 in that there is disposed in the filler cap 9 a pressure safety valve 40, through which fuel vapors can emerge into the open in the event of excess pressure in the interior of the fuel tank.

The pressure safety valve 40, which is of particularly small construction, is realized as follows:

The edge of the sealing membrane 10 is pressed by a disk 43 onto the filler cap 9. To generate the necessary pressure, the disk 43 is centrally mounted by means of a socket pin 45 on an axially guided cylinder 44. The cylinder has a shoulder 44A, that supports a compression spring 46, the other end of which lies against the filler cap 9, so that the cylinder 44 and with it, the disk 11 exerting pressure on the sealing membrane 10 are under tension in the direction of the interior of the fuel tank filler pipe 1. Aside from the edge region, the sealing membrane is provided with holes 10A. Corresponding holes 9A are present in the filler cap 9. If excess pressure develops in the interior of the fuel tank, it is exerted against the underside of the disk 43. When the excess pressure reaches a threshold value, the disk 43, the diameter of which is smaller than the inside diameter of the sealing seat 8, is lifted against the force of the spring 46, so that the edge of the disk 43 is lifted off the sealing membrane 10 and a path to the outside is cleared for the vapors.

Since the self-closing fuel tank closing device of the invention is of extremely small construction, it can be used for all types of fuel tank filler pipes. In the example of the operation of FIG. 4, a fuel tank closing device 4 is shown, which is intended for a fuel tank filler pipe with an internal bayonet fitting. For this purpose, the fuel tank closing device 4 has an internal bayonet closing mechanism 4B with catch hooks 41, which bump against the inner starting ramp of the inverted edge region 1A of the fuel tank filler pipe 1 and thus force the flange 7 against the edge region of the opening. 1A of the fuel tank filler pipe 1. Said edge region is covered with the seal 3. The internal bayonet closing mechanism 4B is connected by ultrasonic welding with the flange 7. Due to the compact construction, the securing of the self-closing fuel tank closing device is not limited to a particular position of rotation. In particular, it is not necessary that the bearing of the swivel-mounted cap 9 lies in the area in which the inverted edge region of the fuel tank filler pipe is interrupted by recesses for the purpose of introducing the catch hooks 41. Rather, the fuel tank filler pipe may be disposed in any position of rotation, so that it is preferably so conceived, that the bearing of the swivel arm 13 lies next to the filler cap 9. The cap 9 thus laterally evades the introduced filling pump delivery nozzle 42. This is advantageous, because the side wall of the filling pump delivery nozzle usually is smooth and the introduction of the filling pump delivery nozzle thus is not impeded by unevenesses.

A magnetic switch (REED switch) 23 disposed on the spring housing 17 to operate a magnetic part (not shown) of a compensator. A release device, consisting of a permanent magnet 22, is mounted on the bracket 16. By opening or closing the filler cap 9, the permanent magnet 22 reaches the vicinity of the magnetic switch 23 or is removed from this, so that the contacts of the magnetic switch open or close. This can be utilized in a known manner for triggering a magnetic valve.

Figure 5:
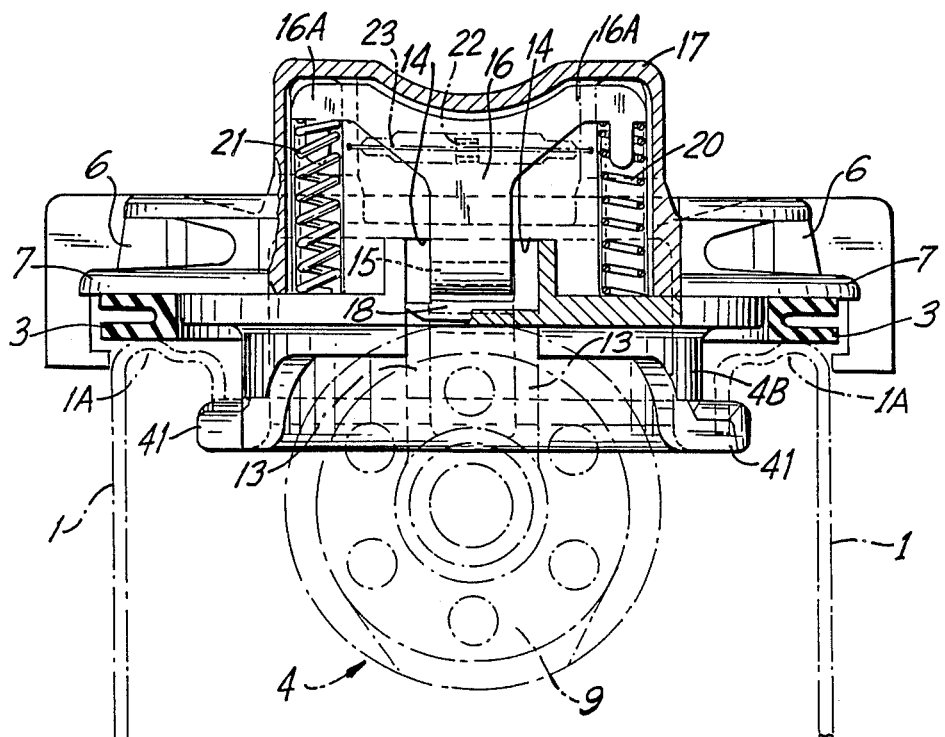
FIG. 5 shows a section along the line V—V of FIG. 4.

FIG. 5 shows the fuel tank closing device of FIG. 3 in section along the line V—V. In this sectional representation, the catch hooks 41, which hold fast the closing device 4 with an internal bayonet fitting as if it were a tank cap on the fuel tank filler pipe 1, can be recognized particularly clearly. FIG. 5 also clearly shows the arrangement of the permanent magnets 22 on the bracket 16, as well as the arrangement of the magnetic switch 23.

Flange 7 can be connected with a tubular threaded part 4A (FIGS. 1, 2 and 3) or with an internal bayonet closing device 4B (FIGS. 4 and 5), so that the fuel tank closing device is suitable for all possible types of fasteners. Obviously, parts 4A and 4B can just as easily be replaced by an external bayonet closing device (not shown). The flange can also be fastened directly to the edge of the opening (perhaps by welding or clamping). Such an embodiment comes into consideration especially for the original equipment of a motor vehicle, while the constructions shown in FIGS. 1 to 5 are intended for retrofitting motor vehicles, for which the fuel tank closing device of the invention is fastened like a tank cap on th fuel tank filler pipe.

Due to its small construction, the fuel tank closing device of the invention is suitable for all the usual fuel tank filler pipes of all normal types of vehicles.

We claim:

1. Self-closing fuel tank closing device mountable on a fuel tank filler pipe and comprising a filler cap which is tensioned in the direction of a sealing seat, is rotatable in the direction of an interior of a spout of the fuel tank roller pipe and is carried by a swivel arm supported at a free end thereof on a supporting surface running approximately perpendicular to a longitudinal axis of the fuel tank closing device, and a clamping device which tensions the filler cap in the direction of the sealing seat and is mounted on the swivel arm in the region between said free end and said filler cap, said free end of the swivel arm being constructed as a cam guide which glides over the supporting surface as said filler cap is tilted.

2. Self-closing fuel tank closing device of claim 1, wherein said cam guide is shaped so that said filler cap, in the course of an opening motion, is shifted translationally in the direction of the interior of the fuel tank filler pipe.

3. Self-closing fuel tank closing device of claim 2, wherein said supporting surface lies at an axial position in the vicintiy of an edge of an opening of the fuel tank filler pipe.

4. Self-closing fuel tank closing device of claim 1, wherein said clamping device comprises a bracket which is hinged to the swivel arm and tensioned by at least one spring.

5. Self-closing fuel tank closing device of claim 4, wherein said bracket glides in an axial guide.

6. Self-closing fuel tank closing device of claim 4, wherein said at least one spring is disposed in a spring housing which projects in an axial direction over an edge of an opening of the fuel tank closing device.

7. Self-closing fuel tank closing device of claim 4, wherein said at least one spring is a compression spring.

8. Self-closing fuel tank closing device of claim 4, wherein two parallel springs are provided to tension said bracket.

9. Self-closing fuel tank closing device of claim 1, and further comprising an operating mechanism adapted to operate a valve, said operating mechanism being disposed on movable parts of said closing device.

10. Self-closing fuel tank closing device of claim 9, wherein said operating mechanism comprises a cam and a cam follower cooperating with said cam.

11. Self-closing fuel tank closing device of claim 9, wherein said operating mechanism comprises an electric switch.

12. Self-closing fuel tank closing device of calm 11, wherein said operating mechanism has a permanent magnet.

13. Self-closing tank device of claim 1, wherein a pressure safety valve is disposed in said filler cap, said safety valve comprising at least one hole disposed in the filler cap and a disk which covers the filler cap from an outside and is tensioned elastically in the direction of the filler cap.

14. Self-closing fuel tank closing device of claim 13, wherein for the elastic tensioning of the disk, said disk is connected with a cylinder which is centrally disposed in the filler cap and stressed by a spring.

* * * * *